United States Patent [19]
Yanagihara et al.

[11] Patent Number: 5,321,440
[45] Date of Patent: Jun. 14, 1994

[54] HIGH EFFICIENCY DATA COMPRESSED IMAGE ENCODING

[75] Inventors: Naofumi Yanagihara, Tokyo; Michio Nagai, Saitama, both of Japan

[73] Assignee: Sony Corporation, Tokyo, Japan

[21] Appl. No.: 891,183

[22] Filed: Jun. 2, 1992

[30] Foreign Application Priority Data

Jun. 7, 1991 [JP] Japan ................. 3-162517

[51] Int. Cl.$^5$ ............................................. H04N 7/133
[52] U.S. Cl. ................................ 348/408; 348/469
[58] Field of Search .............. 358/13, 133, 136, 310, 358/335, 141; H04N 7/133

[56] References Cited

U.S. PATENT DOCUMENTS

| | | | |
|---|---|---|---|
| 4,302,775 | 11/1981 | Widergren | 358/136 |
| 5,006,931 | 4/1991 | Shirota | 358/133 |
| 5,073,820 | 12/1991 | Nakagawa | 358/133 |
| 5,073,821 | 12/1991 | Juri | 358/133 |
| 5,109,451 | 4/1992 | Aono | 358/133 |
| 5,150,208 | 9/1992 | Otaka | 358/133 |

*Primary Examiner*—Howard W. Britton
*Attorney, Agent, or Firm*—William S. Frommer; Alvin Sinderbrand

[57] ABSTRACT

Image data is encoded into sync blocks of fixed length and maximum data volume by dividing a vertical interval of image data samples, such as a field or frame of samples, into a plurality of blocks and deriving the orthogonal transform of the image data samples in each block. A block of conversion coefficients that are produced by the orthogonal transform are quantized with the same quantizing step to produce weighted, quantized conversion coefficients having a weighting factor that is a function of the visual activity of that block. Then, the weighted, quantized conversion coefficients of a block are variable length coded and the variable length codes of a predetermined number of blocks are combined into a sync block of fixed length.

23 Claims, 6 Drawing Sheets

HIGH EFFICIENCY DATA COMPRESSED IMAGE ENCODING

BACKGROUND OF THE INVENTION

This invention relates to image encoding and, more particularly, to high efficiency image encoding using an orthogonal transform, such as the discrete cosine transform, to produce a sync block of encoded image data, wherein the sync block is of a fixed length and exhibits maximum data volume.

Various encoding techniques have been developed for compressing image information, such as video information, for the purpose of transmitting image data or recording image data, such as by magnetic recording. Among these compression techniques are predictive coding, transform coding and vector quantization.

In transform coding, two perpendicular axes are used to transform image data samples, and the amount of data needed to represent the original image information, referred to as "data volume", is reduced by relying on uncorrelated data. For orthogonal transform coding, the basic vectors are, of course, perpendicular to each other and the mean power of the conversion coefficients that are produced by orthogonal transform is substantially equal to the mean signal power of the image data that is presented prior to transform.

The conversion coefficients produced by orthogonal transform are known to have a DC component and several AC components, and the low frequency AC components generally exhibit a higher power concentration than the high frequency AC components. This permits the higher frequency components of the conversion coefficients to be ignored, thus reducing the data volume needed to represent the original image, without serious degradation in the image that is reproduced from these conversion coefficients. Examples of orthogonal transform techniques include the Hadamard transform, Karhunen-Loeve transform, slant transform, discrete sine transform and discrete cosine transform. The use of discrete cosine transform has become quite advantageous, and one example of the use thereof is described in U.S. Pat. No. 5,006,931, assigned to the assignee of the present invention.

In discrete cosine transformation (sometimes referred to as DCT), an image, or more properly samples representing an image, is divided into several image blocks with each block consisting of n samples arrayed in the horizontal direction and n samples arrayed in the vertical direction. That is, each block is formed of a spatial array consisting of n×n samples. The image data samples in each image block are processed by an orthogonal transform using the cosine function. The development of fast processing algorithms implemented on a single chip LSI circuit has enabled real time discrete cosine transformation of image data; and it now is not uncommon for DCT to be used for the transmission and/or recording of image data. Indeed, the discrete cosine transform yields an encoding efficiency that is practically equal to that of the Karhunen-Loeve transform which, in theory, is most favorable. The power concentration of the lower frequency components of the conversion coefficients produced by the discrete cosine transform is practically the same as that of the Karhunen-Loeve transform which, as is known, directly affects coding efficiency. By encoding only those components of the conversion coefficients having concentrated power, the amount of information, or data (i.e. the data volume) which need be transmitted or recorded for accurate representation of the original image is significantly reduced.

As an example of discrete cosine transformation, let it be assumed that an 8×8 block of image data samples is represented as follows:

| 139 | 144 | 149 | 153 | 155 | 155 | 155 | 155 |
| 144 | 151 | 153 | 156 | 159 | 156 | 156 | 156 |
| 150 | 155 | 160 | 163 | 158 | 156 | 156 | 156 |
| 159 | 161 | 161 | 162 | 162 | 155 | 155 | 155 |
| 161 | 161 | 161 | 161 | 160 | 157 | 157 | 157 |
| 162 | 162 | 161 | 163 | 162 | 157 | 157 | 157 |
| 162 | 162 | 161 | 161 | 163 | 158 | 158 | 158 | in which each number in this block represents the magnitude or signal level of the image data sample. When the discrete cosine transform of the 8×8 block of image data samples is derived, conversion coefficients $C_{ij}$ (i represents row number and j represents column number) are produced as follows:

| 314.91 | −0.26 | −3.02 | −1.30 | 0.53 | −0.42 | −0.68 | 0.33 |
| −5.65 | −4.37 | −1.56 | −0.79 | −0.71 | −0.02 | 0.11 | −0.33 |
| −2.74 | −2.32 | −0.39 | 0.38 | 0.05 | −0.24 | −0.14 | −0.02 |
| −1.77 | −0.48 | 0.06 | 0.36 | 0.22 | −0.02 | −0.01 | 0.08 |
| −0.16 | −0.21 | 0.37 | 0.39 | −0.03 | −0.17 | 0.15 | 0.32 |
| 0.44 | −0.05 | 0.41 | −0.09 | −0.19 | 0.37 | 0.26 | −0.25 |
| −0.32 | −0.09 | −0.08 | −0.37 | −0.12 | 0.43 | 0.27 | −0.19 |
| −0.65 | 0.39 | −0.94 | −0.46 | 0.47 | 0.30 | −0.14 | −0.11 | in which the number representing each conversion coefficient represents the relative power of that conversion coefficient. The conversion coefficient $C_{00}$ is referred to as the DC component and represents the mean luminance value of the image block. It is seen that the electric power of the DC component is significantly higher than that of the other components which are known as AC components. As i increases, the frequency of the AC components in the vertical direction increases and as j increases, the frequency of the AC components in the horizontal direction increases. As both i and j increase, the frequency of the AC components in the diagonal direction increases.

The DC component of the conversion coefficients exhibits the largest value and, thus, contains the most information. If the DC component is quantized with a large quantizing step, that is, if it is subjected to coarse quantization, block distortions are produced which appear as noise that is visually detected most readily in the video picture ultimately reproduced from the conversion coefficients, thereby deteriorating the quality of that picture. Consequently, to minimize such visual noise, the DC component of the conversion coefficients, namely $C_{00}$, is quantized with a small quantizing step and is represented by a larger number of bits, such as eight or more bits. A lesser number of bits may be used to represent the higher frequency AC components of the conversion coefficients $C_{ij}$ (where i, j≠0) because higher frequency AC components represent changes in the video information of the n×n block and the human eye does not readily detect detail in a rapidly changing image. Consequently, an observer will not sense a loss of detail in that portion of an image which changes from point to point. Therefore, it is not necessary to represent the higher frequency AC components of the conversion coefficients with a large number of bits. This means that a larger quantizing step can be used to quantize the higher frequency AC components of the conversion coefficients. An example of quantizing the conversion coefficients set out above is as follows:

| | | | | | | | |
|---|---|---|---|---|---|---|---|
| 315.00 | 0.00 | −3.00 | −1.00 | 1.00 | 0.00 | −1.00 | 0.00 |
| −6.00 | −4.00 | −2.00 | −1.00 | −1.00 | 0.00 | 0.00 | 0.00 |
| −3.00 | −2.00 | 0.00 | 0.00 | 0.00 | 0.00 | 0.00 | 0.00 |
| −2.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| −1.00 | 0.00 | −1.00 | 0.00 | 0.00 | 0.00 | 0.00 | 0.00 | in which the quantizing is analogous to "rounding off" the conversion coefficients.

In a practical transmission or recording scheme, the quantized conversion coefficients are encoded by variable length coding, such as Huffman coding or run-length coding which provides further data compression For proper transmission or recording, additional signals, such as synchronizing signals, parity codes, and the like, are added to the variable length coded conversion coefficients.

In digital recording, such as a digital video tape recorder (DVTR), the amount of data which is recorded to represent a vertical interval, such as a field interval or a frame interval, preferably is of a fixed length. That is, although the data representing a particular block of image data samples may be variable, the total amount of data used to represent a predetermined number of those blocks is fixed. If a predetermined number of image blocks is included in a sync block, then although the amount of data (or data volume) of one image block may be less than that of another, the data volume of all sync blocks is substantially constant Since the data volume of a particular image block is determined by the conversion coefficients produced for that block, the conversion coefficients of some image blocks included in a sync block may be quantized with a higher quantizing step than the conversion coefficients of other image blocks. Of course, when a larger quantizing step is used, less data is produced; and as mentioned above, it is not uncommon to quantize the higher frequency AC components of the conversion coefficients with larger quantizing steps than are used to quantize the lower frequency AC components Accordingly, if several different quantizers are connected in common, each exhibiting a different quantizing step, one quantizer may be used to quantize the conversion coefficients of one image block and another may be used to quantize the conversion coefficients of another image block As a result, the overall data volume of the sync block can be optimized without exceeding the data volume capacity, or preset length, of the sync block. However, when different quantizers are selected for different image blocks, the identity of the quantizer which is used for a particular block must be transmitted or recorded This identifying data does not represent useful image information and, thus, tends to increase the "overhead" in a sync block. This is an undesirable byproduct of selecting different quantizers in order to optimize data volume.

To avoid the aforementioned "overhead", it is preferred to use the same quantizer having the same quantizing step for all of the n×n image blocks which are included in a sync block. It is expected that some image blocks will contain more changes in the image therein than others. Thus, the higher frequency AC components of the conversion coefficients in some image blocks will have a higher power concentration than in other image blocks. If these changes in the image data are referred to as the "visual activity" of the image block, then those image blocks having a higher visual activity will have a smaller concentration of lower frequency AC components of the conversion coefficients. Since, as mentioned above, the detail in that portion of an image containing rapid changes, that is, exhibiting a high visual activity, is not readily perceived, an image block having high activity can be quantized with a larger quantizing step without producing notable picture degradation. However, if an image block in the same sync block has low visual activity, that is, if the image block represents a monotonic picture pattern with a small dynamic range, the conversion coefficients are concentrated in the lower frequency AC components. If these conversion coefficients are quantized with a large quantizing step, that is, if they are subjected to the same coarse quantization that can be used for the high activity image blocks in that sync block, block distortions resulting in perceptible deterioration in the reproduced image is produced. Thus, although it is desirable to select a quantizing step that is uniform for all of the image blocks included in a sync block, if this quantizing step is too large, that portion of the image which does not contain high visual activity, that is, those image blocks which do not contain many changes, will be quantized into a number of bits that is not sufficient to represent that portion of the image properly. On the other hand, if a quantizer is selected with a relatively small quantizing step, then an image block which contains high visual activity, that is, a large number of changes therein, will be represented by an unnecessarily large number of bits which is inefficient and which may exceed the overall limit on the data volume in the sync block.

OBJECTS OF THE INVENTION

Therefore, it is an object of the present invention to provide an encoding technique which overcomes the aforenoted drawbacks.

Another object of this invention is to encode the conversion coefficients produced by the orthogonal transform of an image block to maximize the data volume while quantizing image blocks coarsely if they exhibit high visual activity and finely if they exhibit low visual activity.

A further object of this invention is to provide an encoding technique of the aforementioned type in which predetermined number of image blocks are included in a sync block, and the same quantizing step is used to quantize all of the conversion coefficients in all of the image blocks which constitute the sync block while, nevertheless, providing coarse quantization for those image blocks that exhibit high visual activity and fine quantization for those image blocks which exhibit low visual activity.

An additional object of this invention is to provide an encoding technique of the aforementioned type in which block distortions, quantization distortions and deterioration in the quality of the video picture ultimately reproduced from the encoded conversion coefficients are minimized.

Yet another object of this invention is to provide an encoding technique of the aforementioned type in which the quantized conversion coefficients are weighted inversely with respect to the visual activity of the image block from which those conversion coefficients are derived, thereby permitting all of the image blocks in a sync block to be quantized with the same quantizing step.

Various other objects, advantages and features of the present invention will become readily apparent from the ensuing detailed description, and the novel features will be particularly pointed out in the appended claims.

SUMMARY OF THE INVENTION

In accordance with this invention, image data is encoded into sync blocks of fixed length and maximum data volume. A vertical interval of image data samples, such as a field or frame of image data samples, is divided into a plurality of image blocks. The orthogonal transform of the image data samples in each image block is derived to produce conversion coefficients having a DC component and plural AC components for each block. The conversion coefficients of an image block are quantized with the same quantizing step to produce weighted, quantized conversion coefficients having a weighting factor that is a function of detected visual activity of that block. The weighted, quantized conversion coefficients are encoded by variable length coding, and the resultant variable length coded data for each of a predetermined number of image blocks are combined into a sync block whose data volume does not exceed the fixed capacity of the sync block.

As a feature of this invention, the conversion coefficients of an image block are quantized by generating a weighting coefficient as a function of the detected visual activity of the image block, multiplying the conversion coefficients of that image block by the weighting coefficient and then quantizing the weighted conversion coefficients with a selected one of plural different quantizing steps. As one aspect, the weighted conversion coefficients are quantized with different quantizing steps concurrently, as by plural common-connected quantizers. The outputs of the respective quantizers are encoded by respective variable length coders, and a sync block of coded data from each coder is stored. The one sync block which exhibits the highest data volume and does not exceed the capacity of the storage device in which it is stored is sensed, and the quantizing step which produces that sync block is selected. For example, storage overflow from a storage device is sensed, and the next larger quantizing step that is used to produce a sync block that does not result in storage overflow is selected.

Alternatively, the proper quantizing step is selected by using plural common-connected quantizers, each with a different quantizing step, to quantize the weighted conversion coefficients. The data volume that would be attained if a given quantizing step is used is predicted; and if the predicted data volume is within a preset limit, the quantizer having that quantizing step is selected.

As another feature of this invention, the visual activity of each image block is detected as a function of the AC components of the conversion coefficients of that block. In the preferred embodiment, the absolute values of the AC components, preferably the higher frequency AC components, are summed to provide an indication of visual activity.

BRIEF DESCRIPTION OF THE DRAWINGS

The following detailed description, given by way of example, and not intended to limit the invention solely to the embodiments described herein, will best be understood in conjunction with the accompanying drawings in which.

DETAILED DESCRIPTION OF PREFERRED EMBODIMENTS

The present invention finds ready application in efficient data compression encoding of image information, such as video signals. The encoded image data signals may be transmitted, such as in television broadcasting or video information relaying, or the encoded image data signals may be recorded, such as by a digital video tape recorder (DVTR). For convenience, the use of the present invention in a digital video tape recorder is described.

Figure 2:
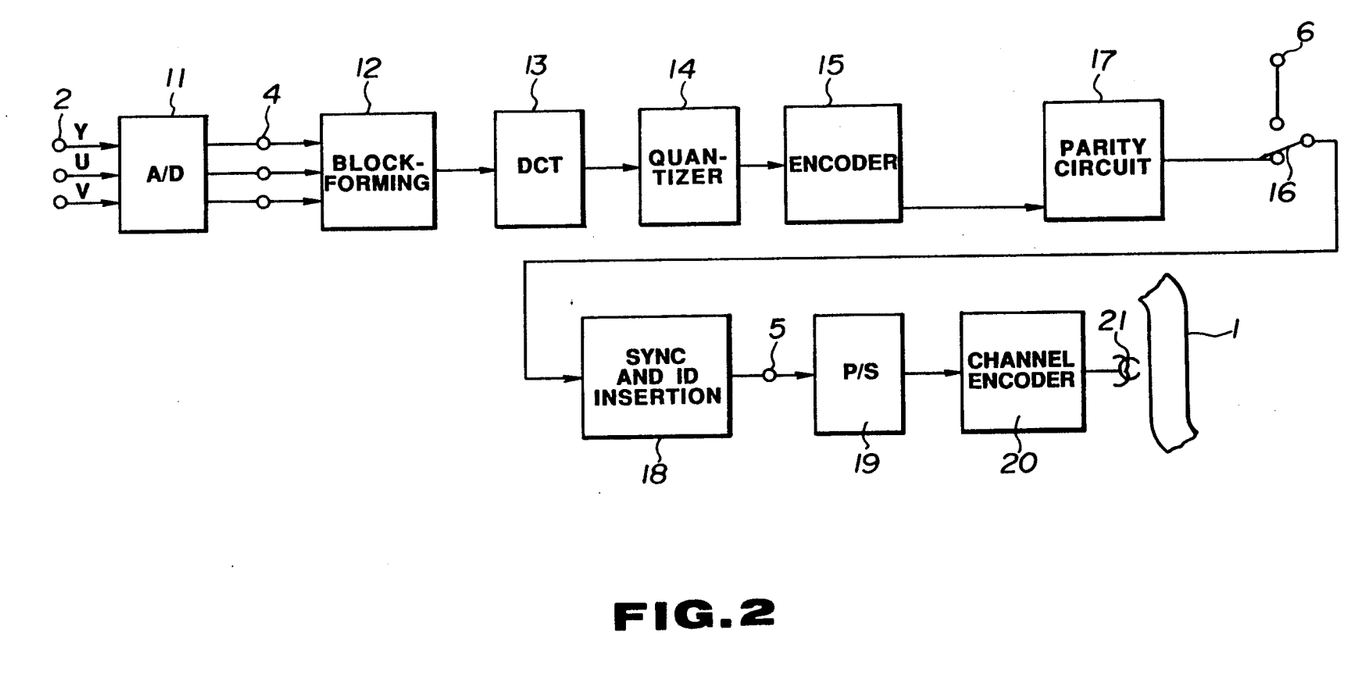
FIG. 2 is a block diagram of a digital video recorder in which the prevent invention finds ready application.

Referring to FIG. 2, there is illustrated, in block diagram form, the primary components of a digital video tape recorder which incorporates the present invention for recording digitized color video signals. This recording apparatus is seen to be comprised of an analog-to-digital (A/D) converter 11, a block forming circuit 12, an orthogonal transform circuit 13, a quantizer 14, an encoder 15, a parity circuit 17 and a channel encoder 20. A/D converter 11 is adapted to sample luminance component Y and chrominance components U and V of an analog video signal. The luminance and chrominance components are supplied to input terminals 2 to which A/D converter 11 is connected. The A/D converter operates in conventional manner to produce a vertical interval of pixels that represent the luminance component Y and the chrominance components U and V. The vertical interval may comprise a field of pixels or a frame of pixels. Moreover, the A/D converter may operate in a manner similar to line sequential sampling to produce a vertical interval of luminance image data samples as well as a vertical interval of chrominance image data samples. These image data samples are provided at output terminals 4 of the A/D converter and supplied therefrom to block forming circuit 12.

The block forming circuit functions to divide a vertical interval of image data samples produced by A/D converter 11 into smaller image blocks. These image blocks are identified herein as image blocks $G_h$ and each image block is comprised of a spatial array of $n \times n$ image data samples. It will be appreciated, then, that the number of image blocks which constitute a vertical interval is a function of the number of pixels, or image data samples included in that vertical interval, divided by the number of image data samples which are included in an image block. Thus, if H represents the number of image blocks included in a vertical interval, and if N represents the number of image data samples included in that vertical interval, then $H = N/n^2$. In aforementioned U.S. Pat. No. 5,006,931, it is suggested that a field interval is comprised of 2700 blocks, the number of effective lines (i.e. line intervals which contain useful video information) in a field is 240 and the number of pixels in a line is 720. If each image block is comprised of a spatial array of $8 \times 8$ image data samples, then $H = (720 \times 240)/(8 \times 8) = 2700$. Thus, if the image blocks in a vertical interval are represented as $G_h$, then h varies from 0 to H, and in the aforementioned example, $H = 2700$.

Orthogonal transform circuit 13 is coupled to block forming circuit 12 and is adapted to derive the orthogonal transform of each image block supplied from the block forming circuit to produce conversion coefficients. In the preferred embodiment, the orthogonal transform is a discrete cosine transform, although other orthogonal transforms known to those of ordinary skill in the art may be used. The theory and operation of the discrete cosine transform is known; and as mentioned above, the conversion coefficients produced by deriving the discrete cosine transform of an image block contain a DC component and several AC components. If each conversion coefficient is represented as $C_{ij}$ (wherein i varies from 0 to $n-1$ and j varies from 0 to $n-1$), $C_{00}$ represents the DC component and all other conversion coefficients are AC components. Conversion coefficients having higher values of i are higher frequency AC components in the vertical direction; and conversion coefficients having higher values of j are higher frequency AC components in the horizontal direction.

Orthogonal transform circuit 13 is coupled to quantizing circuit 14 to supply the conversion coefficients produced by deriving the orthogonal transform for each image block to the quantizing circuit. The quantizing circuit is adapted to quantize the conversion coefficients; and as will be described, a particular quantizing step is used to quantize the conversion coefficients in a predetermined number of image blocks so as to avoid changing the quantizing step from block to block. If a sync block is comprised of this predetermined number of image blocks, then a given quantizing step is used to quantize the conversion coefficients produced in a sync block. As will also be described, the quantizing step is selected to provide a maximum amount of data (referred to as data volume) in the sync block, provided that this quantity of data does not exceed the maximum amount of data that can be contained within the sync block. It will be appreciated that by using the smallest quantizing step that does not result in exceeding the data volume capacity of a sync block, the aforementioned problems of block distortion, quantizing distortion, mosquito noise and the like, all of which result in a degradation of video picture quality, are avoided, or at least minimized.

Quantizing circuit 14 is coupled to encoding circuit 15 to supply the quantized conversion coefficients thereto. The encoding circuit is adapted to encode each quantized conversion coefficient as a variable length code, thereby producing variable length coded conversion coefficients $VLC_j$. Examples of suitable variable length codes include Huffman coding, run-length coding, and the like. It is appreciated that variable length coding provides further data compression in the encoded digital signal, thus enhancing the overall encoding efficiency.

Encoder 15 is coupled to parity circuit 17 which is adapted to generate parity bits as a function of the data included in the encoded sync block supplied thereto from the encoder. The parity circuit is conventional and adds the generated parity bits to the encoded data. The output of parity circuit 17 is coupled to channel encoder 20 by way of a selector switch 16, a sync and ID insertion circuit 18 and a parallel-to-serial (P/S) converter 19, all connected in cascade. Selector switch 16 is adapted to couple the parity circuit or an external coupling terminal 6 to the sync and ID insertion circuit 18. As will be described below, the external terminal is coupled to the sync and ID insertion circuit during a dubbing operation, whereby an encoded video signal that is reproduced from another record medium is coupled directly to sync and ID insertion circuit 18 without first being decoded, dequantized, reconverted to analog form and then digitized, re-quantized and re-encoded.

The sync and ID insertion circuit serves to add identifying bits to the sync block for the purpose of identifying that sync block. If the sync block contains encoded conversion coefficients derived from, for example, image blocks $G_1, G_2, \ldots G_x$, identification bits which serve to identify the sync block thus identify these image blocks; and these ID bits are generated and added to the sync block data by sync and ID insertion circuit 18. In addition, a synchronizing signal normally provided as a header for a sync block is generated by the sync and ID insertion circuit.

The output of sync and ID insertion circuit 18 is coupled to a terminal 5 to which P/S converter 19 is connected. It will be appreciated that the sync block is coupled to terminal 5 as successive multi-bit characters, such as 8-bit words. These eight bits (or any other number of parallel bits which may be used) are serialized by P/S converter 19 and supplied to channel encoder 20. The channel encoder processes the serialized sync block data to a form suitable for recording on a magnetic medium, such as on magnetic tape 1 by a write head 21. Such processing may include scrambling and/or modulation, such as NRZI modulation.

Figure 1:
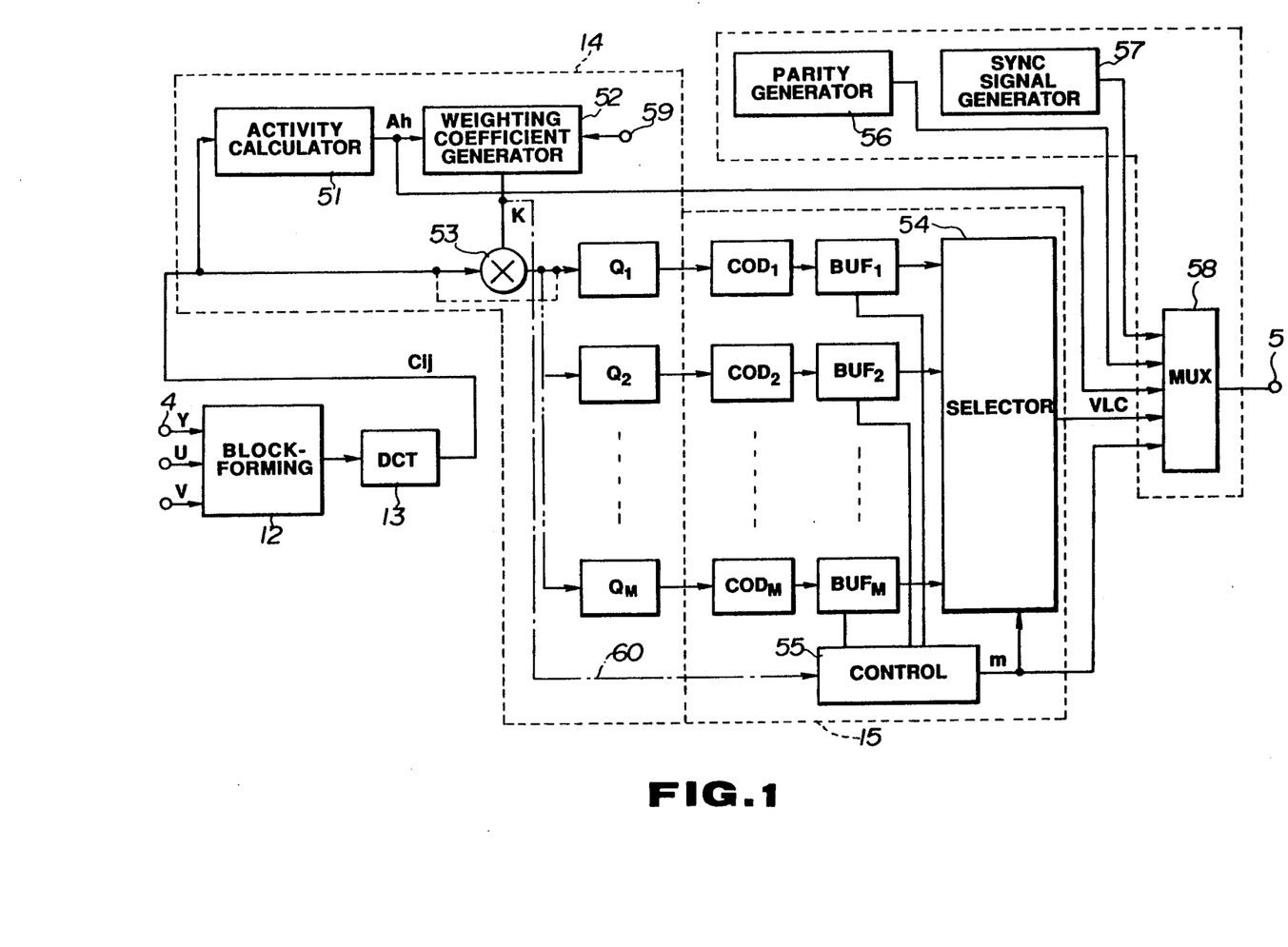
FIG. 1 is a block diagram of one embodiment of an image encoder in accordance with the present invention.

Turning now to FIG. 1, there is illustrated, in greater detail, a preferred embodiment of quantizer 14 and encoder 15, in accordance with one embodiment of the present invention. Quantizer 14 is comprised of an activity calculator 51, a weighting coefficient generator 52, a multiplier 53 and a set of common-connected quantizing circuits $Q_1, Q_2, \ldots Q_M$. The quantizing circuits may be identified as $Q_{mp}$, where m = 1 to M. Activity calculator 51 is coupled to orthogonal transform circuit 13 and is adapted to calculate a representation of the magnitude of the visual activity included in an image block. As mentioned above, changes in an image block constitutes visual activity, and an image block which contains more changes, and particularly rapid changes, exhibits a higher visual activity than an image block containing relatively infrequent or slowly varying changes. Accordingly, activity calculator 51 is connected to receive successive image blocks of conversion coefficients $C_{ij}$ from orthogonal transform circuit 13 and, as will be described, calculates the level of activity $A_h$ of block $G_h$ as a function of the higher frequency AC components of the conversion coefficients in that image block.

Weighting coefficient generator 52 is coupled to activity calculator 51 and is adapted to generate a weighting coefficient $K_h$ for each image block $G_h$ that is inversely related to the calculated visual activity $A_h$. Thus, as the calculated level of visual activity increases, the value of the weighting coefficient K decreases. Conversely, as the calculated level of the visual activity decreases, the value of the weighting coefficient increases. The weighting coefficient $K_h$ generated by the weighting coefficient generator is coupled to multiplier 53 which also is connected to orthogonal transform circuit 13. The multiplier serves to multiply each conversion coefficient $C_{ij}$ produced by the orthogonal transform circuit for an image block $G_h$ by the weighting coefficient $K_h$ for that image block. The resultant weighted conversion coefficients $KC_{ij}$ produced by multiplier 53 are supplied in common to quantizing circuits $Q_1, Q_2, \ldots Q_M$.

Each quantizing circuit operates to quantize the weighted conversion coefficient supplied thereto by a respective quantizing step. For example, quantizing circuit $Q_1$ may exhibit the smallest quantizing step and quantizing circuit $Q_M$ may exhibit the largest quantizing step. If q represents the quantizing step, then the quantizing step of quantizing circuit $Q_1$ may be q, the quantizing step of quantizing circuit $Q_2$ may be 2 q, the quantizing step of quantizing circuit of $Q_3$ may be 4 q, and so on. As another example, quantizing circuit $Q_1$ may quantize the weighted conversion coefficient into an 8-bit signal, quantizing circuit $Q_2$ may quantize the weighted conversion coefficient into a 4-bit signal, quantizing circuit $Q_3$ may quantize the weighted conversion coefficient into a 2-bit signal, and so on. It is, of course, recognized that more information, or bits, are used to represent a quantized weighted conversion coefficient when a smaller quantizing step is used than when a larger quantizing step is used. Stated otherwise, fine quantization is attained by the quantizing circuit exhibiting a small quantizing step and coarse quantization is attained by the quantizing circuit exhibiting a larger quantizing step. As will be described below, an image block exhibiting relatively low visual activity is subjected to fine quantization and an image block containing relatively high visual activity is subjected to coarse quantization. Although coarse quantization typically results in more pronounced quantization errors, such errors are not visually perceived by the human eye if the image itself contains a significant amount of visual activity. Therefore, since a highly active image block is quantized coarsely, such quantization errors are not readily detected.

It is recognized that each quantizing circuit $Q_1 \ldots Q_M$ thus produces quantized data for a given image block $G_h$ with a data volume that differs from the quantized data produced by the other quantizing circuits. In the example discussed above, quantizing circuit $Q_1$ produces quantized data with greater data volume than quantizing circuit $Q_M$.

Figure 4:
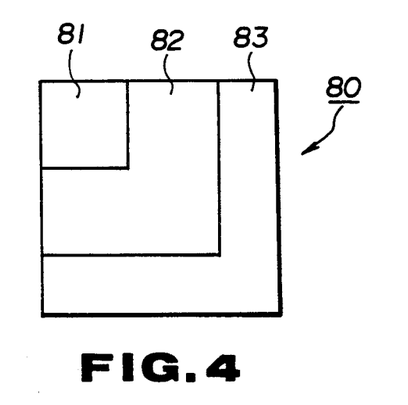
FIG. 4 is helpful in understanding the types of different quantizing steps that may be used when carrying out the present invention.

An example of the different quantizing steps exhibited by the respective quantizing circuits is demonstrated by FIG. 4. Here, an image block of conversion coefficients $C_{ij}$ is represented as block 80. This block of conversion coefficients is divided into different areas, 81, 82 and 83, and each area is associated with a respective quantizing step. The conversion coefficients which are disposed in each respective area are quantized in accordance with the quantizing step assigned to that area. For example, quantizing circuit $Q_1$ quantizes the conversion coefficients disposed within area 81 with the quantizing step q, the conversion coefficients disposed within area 82 also with the quantizing step q and the conversion coefficients disposed within area 82 likewise with the quantizing step q. Quantizing circuit $Q_2$ quantizes the conversion coefficients disposed within areas 81 and 82 with the quantizing step q and the conversion coefficients disposed within area 83 with the quantizing step 2q. Quantizing circuit $Q_3$ quantizes the conversion coefficients disposed within area 81 with the quantizing step q and the conversion coefficients disposed within areas 82 and 83 with the quantizing step 2q. Quantizing circuit $Q_4$ quantizes the conversion coefficients disposed within areas 81, 82 and 83 with the quantizing step 2q. It will be appreciated, without further explanation, that the remaining quantizing circuits quantize the conversion coefficients disposed in the different areas 81, 82 and 83 with similar, differing quantizing steps. Thus, for a given image block $G_h$, the different quantizing circuits quantize the conversion coefficients with different quantizing steps, as aforesaid, to produce quantized data with different data volumes.

It is appreciated that the conversion coefficients quantized by quantizer 14 are derived from image data samples representing color video signals. If the color video signals are presented in, for example, line sequential format, the conversion coefficients derived from the luminance component are separate from the conversion coefficients derived from the chrominance component. Weighting coefficient generator 52 is controlled in response to luminance and chrominance switching signals supplied thereto by, for example, terminal 59, so as to generate a weighting coefficient for the conversion coefficients derived from the luminance component Y, a weighting coefficient derived from the chrominance component U and a weighting coefficient derived from the chrominance component V. Thus, the weighting coefficient generator is controlled, or switched, to provide a proper weighting coefficient for the Y, U and V components, respectively.

Encoder 15 is comprised of plural variable length encoding circuits $COD_1, COD_2, \ldots COD_M$, wherein a particular encoding circuit $COD_m$ is coupled to a corresponding quantizing circuit $Q_m$. Each encoding circuit $COD_m$ is adapted to encode the quantized, weighted conversion coefficients $KC_{ij}$ by variable length coding to produce encoded data $VLC_{ij}$. Since the quantized data $KC_{ij}$ is produced by using different quantizing steps, it is expected that each encoding circuit produces encoded data $VLC_{ij}$ having a data volume which differs from that of the encoded data produced by the other encoding circuits. Thus, and consistent with the example discussed above, it is expected that the data volume of the encoded data produced by encoding circuit $COD_1$ is greater than the data volume of the encoded data produced by encoding circuit $COD_2$, and so on.

Each encoding circuit $COD_m$ is coupled to a buffer memory $BUF_m$ which is adapted to store the encoded data $VLC_{ij}$ of an entire sync block. Each buffer memory exhibits a predetermined storage capacity, and in the preferred embodiment, the storage capacity of all of the buffer memories $BUF_m$ is the same. However, since the encoded data $VLC_{ij}$ produced by the different encoding circuits $COD_1 \ldots COD_M$ exhibit different data volumes, it is not unusual for the data volume of the encoded data supplied to a buffer memory to exceed the storage capacity of that buffer memory. Thus, when a sync block of encoded data is written into a buffer memory, that buffer memory may overflow. A control circuit 55 is coupled to all of the buffer memories $BUF_1 \ldots BUF_M$ and is adapted to determine which of the buffer memories has its storage capacity exceeded by the sync block of encoded data supplied thereto and which of the buffer memories has a storage capacity that is not exceeded. Stated otherwise, control circuit 5 detects the overflow of the respective buffer memories.

Control circuit 55 produces an output indication m which identifies the buffer memory whose storage capacity has not been exceeded and which stores a sync block of encoded data of greatest data volume. For example, and consistent with the example discussed above, if none of the buffer memories overflows, since buffer memory $BUF_1$ stores a sync block of encoded data that is produced with the smallest quantizing step, the sync block of encoded data stored in buffer memory $BUF_1$ has the largest data volume and the output indication produced by the control circuit is indicative thereof (m=1). However, if the data volume of the sync block of encoded data supplied to buffer memory $BUF_1$ exceeds the storage capacity thereof, buffer memory $BUF_1$ overflows and, if buffer memory $BUF_2$ does not overflow, control circuit 55 produces an output indication that buffer memory $BUF_2$ stores the sync block of largest data volume (m=2). Thus, depending upon which buffer memories overflow and which do not, the output indication produced by control circuit 55 indicates the particular buffer memory in which is stored a sync block of encoded data having the highest data volume.

A selector 54 is coupled to each of buffer memories $BUF_1 \ldots BUF_M$ and includes a select control input coupled to control circuit 55 to receive the output indication produced by the control circuit. The selector, which may be thought of as a selector switch or multiplexer, selects the buffer memory indicated by the output indication supplied thereto; and the sync block of encoded data stored in that buffer memory is read out through the selector as encoded data VLC. Thus, the same sync block is processed in parallel with different quantizing steps by quantizing circuits $Q_1 \ldots Q_M$, and the processed sync block having the highest data volume that does not exceed the predetermined storage capacity of the buffer memory is selected. It is recognized that the selected sync block thus contains encoded data $VLC_{ij}$ that is quantized with the minimum quantization step such that the data volume of that sync block is a maximum but does not exceed a predetermined data quantity. The sync block is comprised of a fixed number of image blocks, and by assuring that the data volume of the selected sync block is a maximum but does exceed a predetermined volume, the conversion coefficients of the selected sync block will be most finely quantized.

The selected sync block of encoded data VLC is coupled by selector 54 to a multiplexer 58. This multiplexer also is coupled to control circuit 55 to receive the output indication m which serves to identify the particular quantizing channel (formed of quantizing circuit $Q_m$, encoding circuit $COD_m$ and buffer memory $BUF_m$) that is selected. The multiplexer also is coupled to activity calculator 51 to receive the calculated visual activity level $A_h$ of each image block $G_h$ included in this sync block Also, the multiplexer is coupled to a parity generator 56 to receive the parity bits generated for the sync block; and the multiplexer is further coupled to a sync signal generator 57 to receive synchronizing signals produced at the header of each sync block. The output of multiplexer 58 is coupled to terminal 5 (also shown in FIG. 2) to supply the sync block to, for example, parallel-to-serial converter 19 of FIG. 2. Although not shown, it will also be appreciated that sync signal generator 57 supplies ID bits to the multiplexer to identify the particular sync block that is processed by the quantizing and encoding apparatus.

Figure 5:
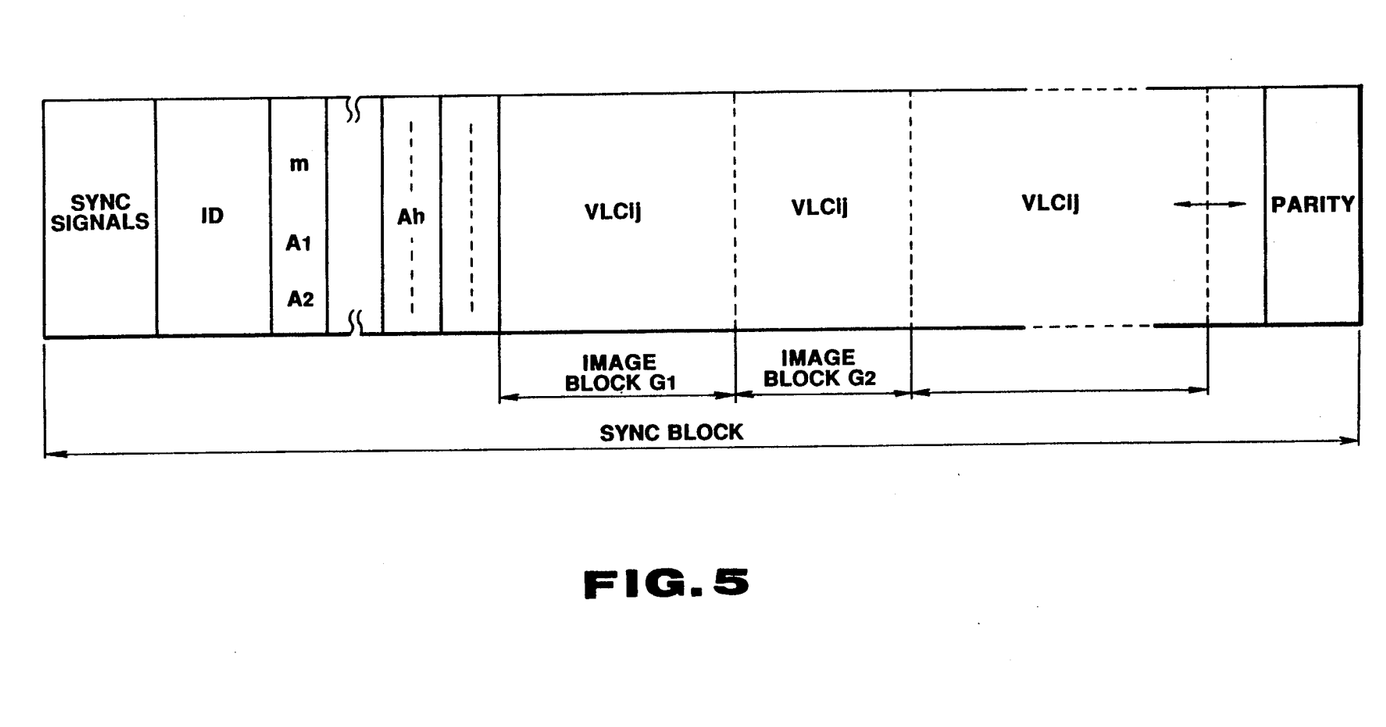
FIG. 5 is a schematic representation of a sync block of image data in accordance with the present invention.

Multiplexer 58 combines the sync signals and sync block ID bits supplied thereto by sync signal generator 57, the output indication m supplied thereto by control circuit 55, the visual activity level $A_h$ calculated for each image block by activity calculator 51, the encoded, quantized conversion coefficients VLC for each of the image blocks included in the sync block and selected by selector 54 and the parity bits generated by parity generator 56 in time division multiplexed format. FIG. 5 is a schematic representation of the time division multiplexed data produced by multiplexer 58. By reason of the variable length coding, the length of each image block $G_h$ of encoded data may differ from image block to image block. But, since the data volume of the sync block is selected to be a maximum, the overall length of the sync block is fixed. As illustrated in FIG. 5, there may be some margin, or tolerance, between the encoded data of the last image block included in a sync block and the parity bits because the data volume of each sync block, although a maximum, nevertheless may differ from one sync block to the next. However, this margin is minimal and does not detract from the efficiency of the encoding technique described herein.

Since the operation of the apparatus illustrated in FIG. 1 is apparent from the foregoing discussion, further description thereof is provided only briefly herein. As mentioned previously, a vertical interval of image data samples, such as a field or frame of image data samples, is supplied by way of terminals 4 to block forming circuit 12. Preferably, the image data samples of the luminance component Y are processed separately from the image data samples of the chrominance components U and V. The block forming circuit divides the vertical interval of image data samples into smaller image blocks $G_h$ and each image block is comprised of a spatial array of n×n image data samples. Orthogonal transform circuit 13, which preferably is a discrete cosine transform circuit, derives conversion coefficients $C_{ij}$ from each image block. It is appreciated that a predetermined number of image blocks constitute a sync block.

The conversion coefficients $C_{ij}$ of an image block are supplied to activity calculator 51 which calculates the visual activity level $A_h$ of that image block $G_h$. This calculation is determined as a function of the higher frequency AC components of the conversion coefficients in block $G_h$. The visual activity may be calculated by detecting the maximum value of the higher frequency AC components, by detecting deviations among the high frequency AC components or, preferably, by summing the absolute values of the higher frequency AC components. The selection of fine or coarse quantization of the image block of conversion coefficients is determined by the calculated visual activity. Fine quantization is selected when a low level of visual activity is calculated and coarse quantization is selected when a high level of visual activity is calculated. It should be appreciated that coarse or fine quantization is a function of the weighting coefficient by which the conversion coefficients of the image block are multiplied. A higher weighting coefficient is equivalent to fine quantization.

The weighting coefficient is inversely related to the calculated visual activity level such that the conversion coefficients are more highly weighted for lower visual activity. Thus, the conversion coefficients are quantized more finely for lower visual activity, even though the same quantizing circuit $Q_m$ is used for all of the image blocks $G_h$ in a sync block.

Figure 6A:
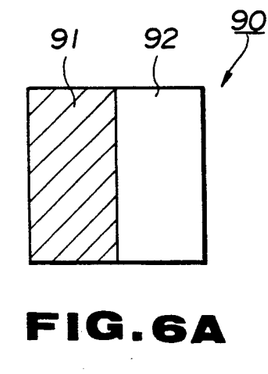
FIGS. 6A–6C schematic representations of different image blocks which are useful in explaining the advantages derived from the technique used with the present invention to calculate visual activity.
Figure 6B:
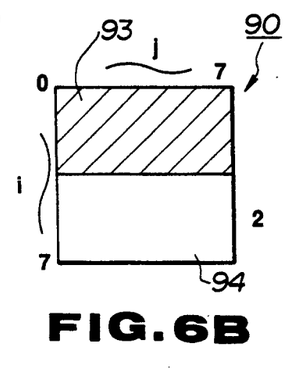

By using the higher frequency AC components of the conversion coefficients to calculate visual activity, errors in visual activity calculations that otherwise may appear in certain monotonic images are avoided. This is best appreciated by referring to FIGS. 6A-6C. Image block 90 in FIG. 6A represents an image having a dark subarea 91 and a light subarea 92 which define a vertical boundary therebetween. The AC components of the conversion coefficients that are derived from image block 90 exhibit higher magnitudes in the horizontal direction. If, however, the image block appears as image block 90' in FIG. 6B, formed of a dark subarea 93 and a light subarea 94 to define a horizontal boundary therebetween, the AC components of the conversion coefficients exhibit higher magnitudes in the vertical direction. If the AC components of the conversion coefficients derived from image block 90 or from image block 90' are simply summed, or if the maximum AC component is detected to calculate visual activity, the visual activity calculated for image blocks 90 and 90' will be relatively high even though these image blocks are generally monotonic. If the conversion coefficients are quantized as a function of the thus calculated activity level, the conversion coefficients will be subject to coarse quantization even though the image blocks contain relatively low visual activity, thereby producing what is known as mosquito noise in the video picture which ultimately is reproduced.

The foregoing error in calculating visual activity is avoided by summing the absolute value of the higher frequency AC components of the conversion coefficients. This is demonstrated in FIG. 7 in which a block 100 of conversion coefficients is represented. Subarea 101 identifies that area of the block of conversion coefficients which contain the higher frequency AC components. If the conversion coefficients are derived from image block 90 in FIG. 6A or from image block 90' in FIG. 6B, it is recognized that the AC components in subarea 101 are of relatively low magnitude. Therefore, by summing the absolute values of the AC components in subarea 101, the calculated visual activity of image blocks 90 and 90' is relatively low. Hence, the conversion coefficients are finely quantized, which is a proper quantization for a monotonic pattern, thus avoiding or at least minimizing mosquito noise.

Figure 6C:
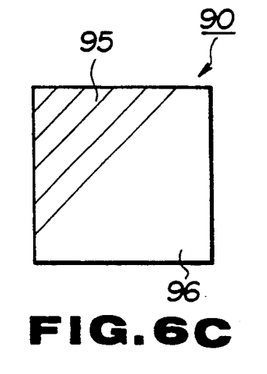

If image block 90" shown in FIG. 6C is presented for orthogonal transform processing and activity calculation, the oblique boundary defined by the dark and light subareas 95 and 96 produces conversion coefficients whose higher frequency components are seen to increase in the horizontal and vertical directions. Hence, the activity level of image block 90" will be calculated as being relatively high, resulting in coarse quantization of the conversion coefficients. While this reduces the data and, thus, the detail in the encoded data that represents image block 90", quantization noise will not be easily perceived because of the rapid changes in the image information as shown by the obliquely extending components.

Returning to FIG. 1, the activity level $A_h$ calculated by activity calculator 51 for image block $G_h$ is supplied to weighting coefficient generator 52 which generates the weighting coefficient $K_h$ for this image block. The weighting coefficient is used to weight, or multiply, all of the conversion coefficients $C_{ij}$ derived from this image block. The weighted conversion coefficients are supplied in common to the different quantizing circuits $Q_1 \ldots Q_M$ whereat the conversion coefficients are quantized concurrently with different quantizing steps, thereby producing differently quantized data for the same image block. Encoding circuits $COD_1 \ldots COD_M$ encode the differently quantized data produced for the image block $G_h$ by variable length coding, and the variable length coded data thus produced by each encoding circuit is stored in a respective one of buffer memories $BUF_1 \ldots BUF_M$.

The foregoing process is repeated for each image block included in a sync block, thus accumulating in each buffer memory the same sync block, but the sync block stored in a respective buffer memory is quantized with a different quantizing step. Thus, the storage capacity of some of the buffer memories may be exceeded by the sync block stored therein, whereas the data volume of sync blocks stored in other buffer memories may be less than the storage capacity thereof. It is recognized that when the storage capacity of a buffer memory is exceeded, the buffer memory supplies an overflow signal to control circuit 55. The control circuit supplies to selector 54 an output indication of the buffer memory that has not been overflowed and, moreover, that stores a sync block produced from encoded conversion coefficients that had been quantized with the lowest quantizing step which did not result in overflow. For example, if buffer memory $BUF_1$ overflows but buffer memory $BUF_2$ does not, the output indication supplied to selector 54 by control circuit 55 is indicative of buffer memory $BUF_2$. Similarly, if buffer memories $BUF_1$ and $BUF_2$ both overflow but buffer memory $BUF_3$ does not, then the output indication supplied to the selector is indicative of buffer memory $BUF_3$. The sync block stored in the buffer memory indicated by the output indication supplied to selector 54 by control circuit 55 is read out from that buffer memory as encoded data VLC and is supplied to multiplexer 58 whereat the aforementioned sync signals, sync block ID bits, output indication and visual activity level all are time division multiplexed therewith, resulting in the sync block shown schematically in FIG. 5. Thus, it is seen that the sync block of encoded data VLC is comprised of weighted conversion coefficients derived from a predetermined number of image blocks $G_h$, and the weighted conversion coefficients of all of these image blocks included in the sync block are quantized with the same quantizing step. That is, in the embodiment shown in FIG. 1, different quantizing steps are not used to quantize the conversion coefficients in different image blocks included in the same sync block.

Figure 3:
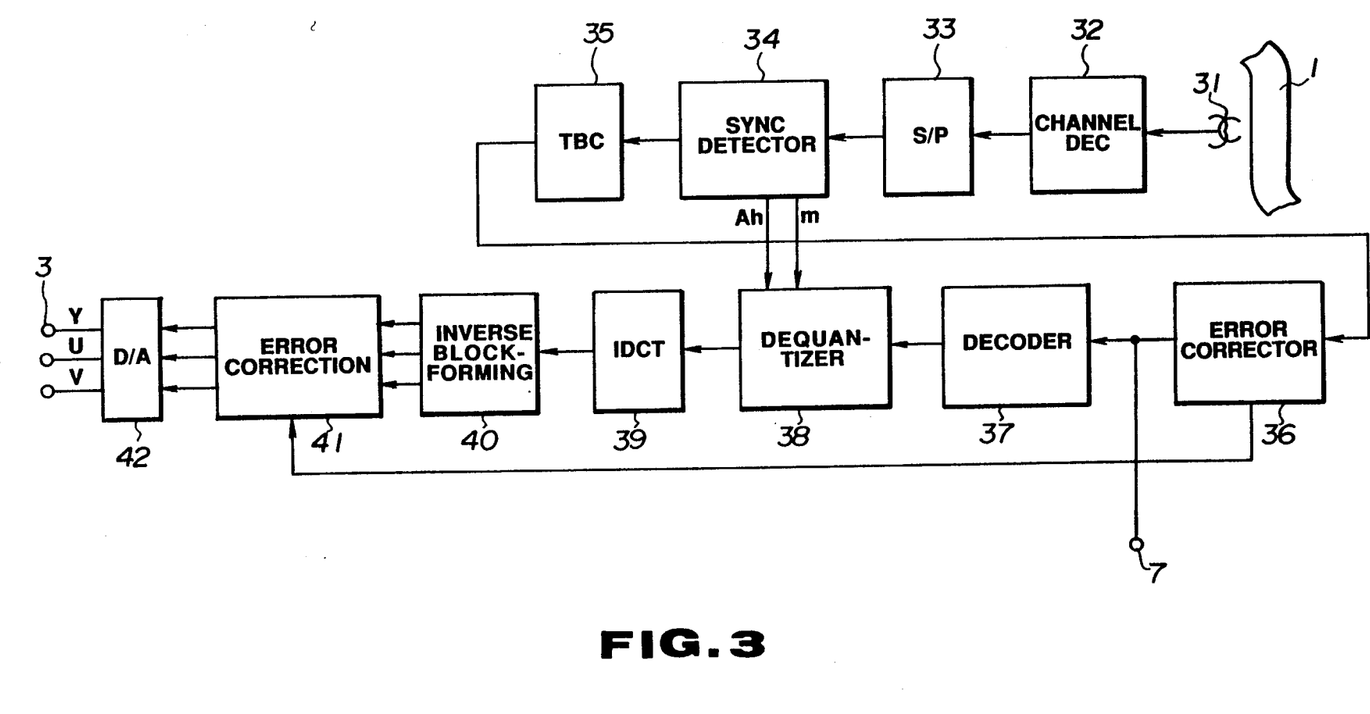
FIG. 3 is a block diagram of a digital video reproducer for recovering video signals that had been encoded in accordance with the present invention.

Sync blocks that are produced by the encoding apparatus shown in FIG. 1 and recorded by the recording arrangement illustrated in FIG. 2 may be reproduced from the record medium, such as magnetic tape 1, by the reproducing apparatus illustrated in FIG. 3. As shown, this reproducing apparatus includes a channel decoder 32, a sync detector 34, an error corrector 36, a Variable length decoder 37, a dequantizer 38, an inverse discrete cosine transform circuit 39, an inverse block former 40, an error correction circuit 41 and a digitalto-analog converter (DAC) 42. Channel decoder 32 is coupled to a playback head 31 to receive the modulated signals that had been recorded on magnetic tape 1 by write head 21 of FIG. 2. Accordingly, the channel decoder is adapted to demodulate and/or descramble the reproduced signals to recover digital information therefrom. As an example, if the recorded signals had been modulated with NRZI modulation, the channel decoder includes an NRZI demodulator.

Channel decoder 32 is coupled to sync detector 34 by way of a serial-to-parallel (S/P) converter 33. It is recalled that multi-bit characters had been serialized by P/S converter 19 prior to recording; and S/P converter 33 functions to return the serialized multi-bit characters into parallel form. These parallel-bit characters are supplied to sync detector 34 whereat the sync signals included in the sync block shown in FIG. 5 are detected. This assures synchronous detection and recovery of the reproduced sync blocks.

The sync detector is adapted to reproduce the encoded data $VLC_{ij}$ which is coupled to error corrector 36 by way of time base corrector 35. The time base corrector is a conventional device that is used for eliminating jitter and other time base errors that may be produced during the reproduction of the encoded data from magnetic tape 1. Once jitter has been corrected, or removed, error corrector 36 functions to correct errors that may be present in the recovered sync block by using the parity bits included therein. If, however, the parity bits cannot be used to correct an error, for example, if the error is too large, an error flag is set to identify the uncorrectable error.

Then, after error correction, the sync block is coupled to variable length decoder 37 which decodes the variable length encoded, quantized conversion coefficients. In particular, decoder 37 operates to complement the variable length coding that had been carried out by one of the encoding circuits $COD_1 \ldots COD_M$, shown in FIG. 1 Accordingly, decoder 37 recovers the quantized conversion coefficients; and these quantized conversion coefficients are coupled to dequantizer 38 which operates to complement the selected quantizing circuit $Q_1 \ldots Q_M$ that had been used for recording. The sync block that had been recorded and reproduced from magnetic tape 1 includes output indication m therein, such as shown in FIG. 5, and this output indication is used to identify the quantizing step that had been selected to quantize the conversion coefficients. It is appreciated that the complementary dequantizer is selected by this indication m to effect a proper dequantization.

Once dequantized, the conversion coefficients are coupled to inverse discrete cosine transform circuit 39 which operates in a manner inverse to that of discrete cosine transform circuit 13. Hence, the conversion coefficients $C_{ij}$ are used by the inverse discrete Cosine transform circuit 39 to recover the n×n array of image data samples included in each of the image blocks that comprise the sync block. The resultant, recovered image blocks of image data samples are re-formed into a vertical interval, such as a field or frame, by inverse block former 40.

The recovered vertical interval of image data samples are coupled to error correction circuit 41 wherein those errors that could not have been corrected by error corrector 36 are corrected here by more sophisticated, known techniques, such as by interpolation. Such error corrections are achieved by using the error flags that had been set by error corrector 36.

The error-corrected re-formed vertical interval of image data samples are coupled to DAC 42 whereat they are converted from digital form to analog form and supplied as analog signals to output terminals 3. Since the luminance and chrominance components are processed and recorded separately, as discussed above, the reproducing apparatus illustrated in FIG. 3 recovers separately the luminance and chrominance components Y and U, V to be further coupled to other circuitry (not shown).

It will be appreciated that sync detector 34 is adapted to recover the output indication m and the visual activity level $A_h$ (shown in FIG. 5) from the recorded sync block. Output indication m, which represents the quantizing step used during the recording operation, is supplied to decoder 37 and to dequantizer 38 to select the proper dequantizing circuit which exhibits the corresponding quantizing step. Similarly, the recovered visual activity level $A_h$ is supplied from sync detector 34 to dequantizer 38 to select the proper inverse weighting coefficient with which the decoded, dequantized conversion coefficients are multiplied. This restores the weighted conversion coefficients to their original, unweighted values. It is seen that since the visual activity level $A_h$ determines the weighting coefficient $K_h$, it is a simple matter to select the inverse weighting coefficient $1/K_h$ from this same visual activity level.

The VTR recording apparatus shown in FIG. 2 and the VTR playback apparatus shown in FIG. 3 are particularly adapted for dubbing digital video signals reproduced from one magnetic tape onto another. In a typical digital VTR, digital video signals which are reproduced from a magnetic tape generally are subjected to digital processing, which includes error correction, decoding, dequantizing, inverse transformation and digital-to-analog recording, to recover analog signals which then are digitized, transformed, requantized and encoded before re-recording. As will be appreciated, the steps of quantizing/dequantizing, transforming/inverse-transforming and A/D/A conversion not only introduce errors into the original information but amplify such errors. For example, A/D conversion inherently produces a small digitizing error, and this small error is compounded by D/A conversion which results in an analog signal whose level is expected to differ somewhat from the original analog signal level. Likewise, the conversion coefficients produced by deriving the orthogonal transform of digital video samples, although a very close approximation of the original video information nevertheless is not a precise, exact representation. Therefore, the signal processing operations which are carried out to play back and then re-record (or dub) digital video signals with high efficiency coding introduces errors into the re-recorded digital video signals. When the higher frequency components of the conversion coefficients $C_{ij}$ are subjected to coarse quantization, as is desired in order to limit the bandwidth needed to represent the digital video signals, processing errors are accumulated when a dubbing operation is executed, thereby degrading the quality of the video picture eventually reproduced from the video signals.

This drawback is overcome by providing dubbing output taps, or terminals, in the VTR recording apparatus as well as in the VTR playback apparatus which, when interconnected, effectively bypasses those circuits which inherently introduce errors into the processed digital signals and permit the direct re-recording of digital signals without subjecting those signals to D/A/D conversion. These output taps are shown as output terminals 7 (FIG. 3) and 6 (FIG. 2) provided in the reproducing and recording apparatus, respectively. Output terminal 7 is coupled to the output of error corrector 36 to provide an error corrected, time-base-corrected parallel digital signal representing the quantized, weighted conversion coefficients in the predetermined number of image blocks which constitute a sync block. That is, the sync block illustrated in FIG. 5 is provided at output terminal 7, and this output terminal is connected to external terminal 6 in FIG. 2. When in the dubbing mode, selector switch 16 of the recording apparatus shown in FIG. 2 is coupled to external terminal 6 to supply the sync block reproduced by the reproducing apparatus of FIG. 3 to parallel-to-serial converter 19 and channel encoder 20 for re-recording on magnetic tape 1 by write head 21 Thus, the digital video data reproduced by read head 31 is dubbed without being decoded, dequantized, inversely transformed, D/A converted, A/D converted, orthogonally transformed, requantized and re-encoded, as is the case with prior art dubbing arrangements. Consequently, digital video information which had been compressed with desirably high efficiency is not subjected to inherent processing errors when that compressed digital video information is dubbed onto another record medium.

Figure 8:
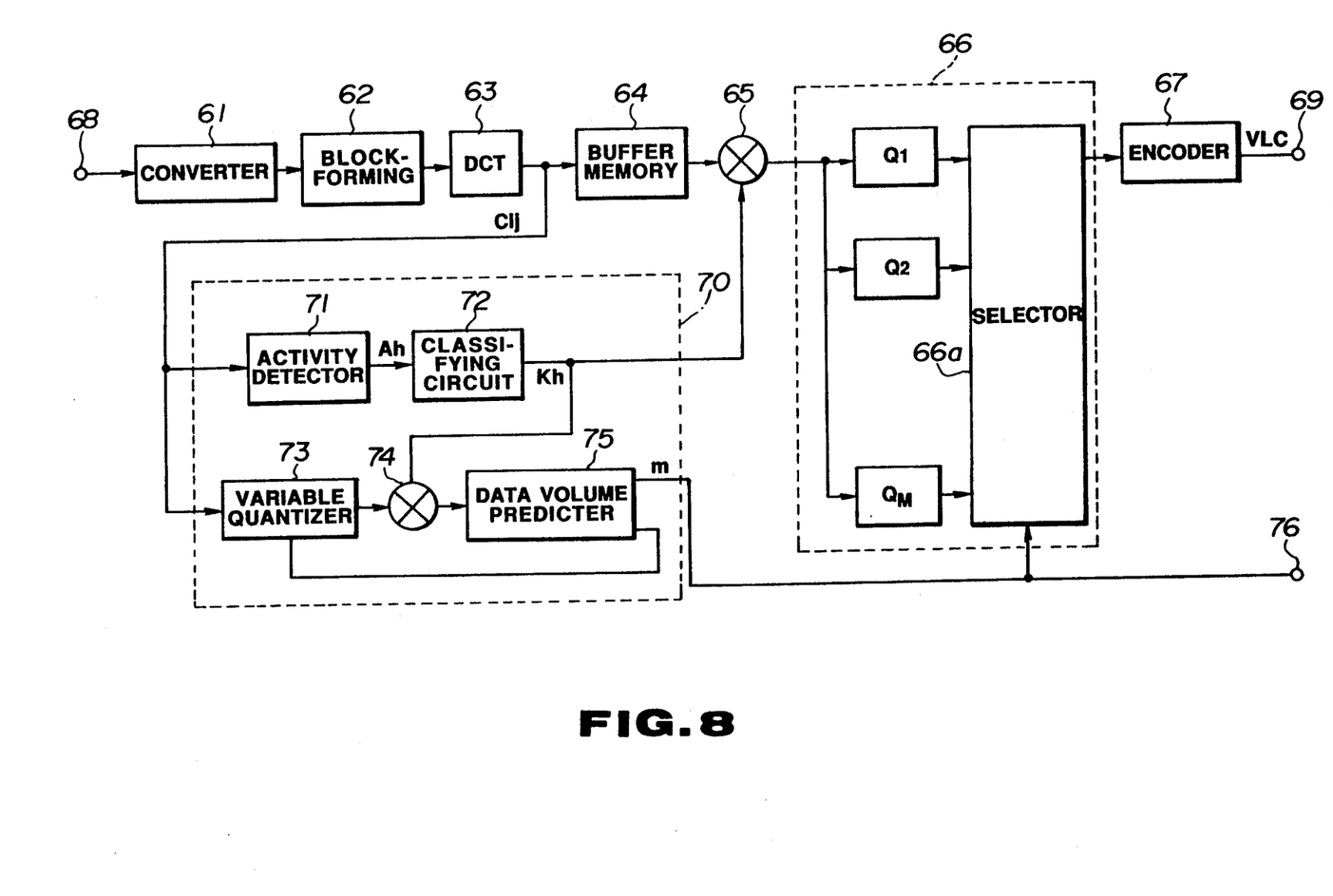
FIG. 8 is a block diagram of another embodiment of 14 encoder apparatus in accordance with the present invention.

Another embodiment of quantizer 14 and encoder 15 of the digital video recording apparatus in accordance with another embodiment of the present invention is illustrated in FIG. 8. Here, the quantizer is comprised of a buffer memory 64, a weighting circuit 65, a selectable quantizer 66 and a data volume estimator 70. Buffer memory 64 is coupled to an orthogonal transform circuit 63 to receive the conversion coefficients $C_{ij}$ produced thereby. As before, the orthogonal transform circuit may be a discrete cosine transform circuit and functions to derive the conversion coefficients in an image block of image data samples produced by block forming circuit 62. These image data samples are digital samples generated by an A/D converter 61 from analog video signals coupled thereto by way of an input terminal 68. It will be appreciated, therefore, that A/D converter 61, block forming circuit 62 and orthogonal transform circuit 63 may be substantially similar to aforedescribed A/D converter 11, block forming circuit 12 and orthogonal transform circuit 13, shown in FIG. 2.

Buffer memory 64 is adapted to store a sync block of conversion coefficients which subsequently is read out to weighting circuit 65. Thus, the buffer memory exhibits a storage capacity sufficient to store the conversion coefficients $C_{ij}$ derived from image blocks $G_1, G_2, \ldots G_h$, where h is the predetermined number of image blocks which constitute a sync block. Weighting circuit 65 may comprise a multiplier similar to aforedescribed multiplier 53 (FIG. 1) and is adapted to multiply, or weight, the conversion coefficients read out from buffer memory 64 with a weighting coefficient $K_h$, wherein $K_h$ is the weighting coefficient that is determined for the particular image block then being read from the buffer memory. The weighting coefficient $K_h$ is produced by a classifying circuit 72 included in data volume estimator 70, as will be described.

The weighted conversion coefficients $KC_{ij}$ produced by weighting circuit 65 are coupled to selectable quantizer 66 which is comprised of a plurality of quantizing circuits $Q_1, Q_2, \ldots Q_M$ that may be similar to aforedescribed quantizing circuits $Q_1 \ldots Q_M$ of FIG. 1. The quantizing circuits included in selectable quantizer 66 thus exhibit different quantizing steps; and for convenience, it is assumed that quantizing circuit $Q_1$ exhibits the smallest quantizing step to produce fine quantization and quantizing circuit $Q_M$ exhibits the largest quantizing step to produce coarse quantization. These quantizing circuits are coupled to a selector 66a which is controlled by a selector control signal produced by a data volume predictor 75 included in data volume estimator 70. As will be described below, the data volume predictor is adapted to determine the smallest quantizing step that should be used to quantize the conversion coefficients in a sync block which will produce a maximum data volume that does not exceed the data volume capacity of the sync block. Selector 66a selects this quantizing circuit and couples the output thereof to an encoder 67. Hence, encoder 67 is supplied with a sync block of quantized, weighted conversion coefficients exhibiting the smallest quantizing step that can be accommodated by the sync block.

Encoder 67 preferably is a variable length encoder similar to encoding circuits $COD_1 \ldots COD_M$ shown in FIG. 1. The encoder functions to code the quantized conversion coefficients supplied thereto by selector 66a with variable length coding, such as Huffmann coding, run-length coding, and the like. The variable length coded data VLC produced by encoder 67 is coupled to an output terminal 69 which, for example, may supply the encoded data to parity circuit 17 of FIG. 2.

As mentioned above, data volume estimator 70 is adapted to estimate, or predict, the smallest quantizing step that can be used to quantize the weighted conversion coefficients so as to produce a sync block of maximum data volume which, nevertheless, does not exceed a preset data volume limit. That is, the maximum data size, or limit, of the sync block shown in FIG. 5 cannot be exceeded. The data volume estimator includes an activity detector 71, a classifying circuit 72, a variable quantizer 73, a multiplier 74 and data volume predictor 75. Activity detector 71 may be similar to aforedescribed activity calculator 51 and is adapted to calculate the level of activity $A_h$ of an image block $G_h$ as a function of the higher frequency AC components of the conversion coefficients $C_{ij}$ included in that image block, as supplied to the activity detector by orthogonal transform circuit 63. Classifying circuit 72 is coupled to activity detector 71 and is adapted to produce the weighting coefficient $K_h$ as a function of the activity level detected for the image block then being supplied to the activity detector. This weighting coefficient $K_h$ is coupled to weighting circuit 65, as mentioned above, and also to multiplier 74.

As one example, classifying circuit 72 is adapted to classify the activity level of an image block $G_h$ into high and low activity levels, depending upon the value of the activity level $A_h$ produced by activity detector 71. If the activity level $A_h$ exceeds a predetermined threshold THE, the classifying circuit classifies the image block as a high activity block; and if the detected activity level $A_h$ is less than this threshold level THE, classifying circuit 72 classifies the image block $G_h$ as a low activity block. For example, the weighting coefficient $K_h$ produced by classifying circuit 72 may be $K_h = \frac{1}{2}$ if the activity level $A_h$ is greater than the threshold level ($A_h >$ THE) and $K_h = 1$ if the activity level is less than the threshold level ($A_h <$ THE).

Variable quantizer 73 is coupled to orthogonal transform circuit 63 to receive successive image blocks of conversion coefficients $C_{ij}$. The variable quantizer also is supplied with a control signal fed back thereto from data volume predictor 75 which is used to selectively change the quantizing level of the variable quantizer. For example, if the data volume predictor estimates the data volume of a sync block to be greater than the preset limit, or data capacity, of that sync block when a particular quantizing step is used by variable quantizer 73, the control signal fed back to the variable quantizer increases the quantizing step which, in turn, decreases the estimated data volume of the sync block. If the data volume now estimated by data volume predictor 75 for this increased quantizing step still exceeds the preset limit, the control signal fed back to variable quantizer 73 causes a further increase in the quantizing step. As a result, a particular quantizing step is selected which is the smallest quantizing step that can be used to quantize the conversion coefficients without exceeding the data volume capacity of a sync block.

Variable quantizer 73 is coupled to data volume predictor 75 by multiplier 74. This multiplier may be similar to multiplier 65 and is adapted to multiply the quantized conversion coefficients produced by the variable quantizer by the weighting coefficient $K_h$ produced by classifying circuit 72. Thus, data volume predictor 75 is supplied with weighted, quantized conversion coefficients so as to provide a good approximation of the data volume resulting from the quantized, weighted conversion coefficients.

Those of ordinary skill in the art recognize that the image information in adjacent image blocks formed of 8×8 pixel arrays does not change significantly. Although the image information in adjacent image blocks may not be identical, a large change in such image information is not expected and is highly unlikely. Therefore, from the aspect of statistical analysis, a reasonably good estimation of the amount of data needed to represent a predetermined number of image blocks, such as the number of image blocks which constitute a sync block, can be made on the basis of the amount of data that is needed to represent one of those image blocks. This is the function of data volume predictor 75. For example, variable quantizer 73 may be set initially to exhibit the smallest quantizing step. The conversion coefficients included in the first image block of a sync block are quantized with this quantizing step and then weighted in multiplier 74 by weighting coefficient K. The data volume predictor operates to estimate the data volume of this image block based upon the quantizing step selected for variable quantizer 73. The estimated data volume of the sync block may be approximated by multiplying the estimated data volume of the image block by the number of image blocks included in the sync block. If the estimated sync block data volume exceeds the capacity thereof, data volume predictor 75 feeds back a control signal to variable quantizer 73 to increase the quantizing level. Accordingly, when the next image block of conversion coefficients is supplied to the variable quantizer by orthogonal transform circuit 63, such conversion coefficients are quantized with this larger quantizing step. The data volume predictor once again estimates the data volume of this image block; and that estimated data volume is used to approximate the data volume of the sync block if this higher quantizing step is used. If the approximated data volume still exceeds the preset limit, the foregoing feedback operation is repeated. Eventually, the sync block data volume approximated by data volume predictor 75 does not exceed the sync block data volume capacity; and the quantizing step which had been selected to produce this approximation is represented by the selector control signal that is supplied from the data volume predictor to selector 66a, thereby selecting the quantizing circuit $Q_m$ having a corresponding quantizing step.

As each image block of conversion coefficients is supplied in succession to variable quantizer 73, that image block also is supplied to and stored in buffer memory 64. It will be appreciated that, even in the worst case, data volume predictor 75 and variable quantizer 73 cooperate to select the smallest quantizing step to produce maximum, permissible data volume (i.e. a data volume that does not exceed the preset limit) before an entire sync block of conversion coefficients is stored in the buffer memory. After a sync block has been stored, the conversion coefficients are read out from buffer memory 64 to weighting circuit 65 whereat they are weighted with the weighting coefficient K produced by classifying circuit 72. The weighted conversion coefficients $KC_{ij}$ are supplied in common to quantizing circuits $Q_1 \ldots Q_M$; and selector 66a responds to the selector control signal produced by data volume predictor 75 to select the quantizing circuit having the smallest quantizing step which has been estimated to result in a sync block data volume that does not exceed the sync block data capacity. That is, the fixed length of the sync block (as shown in FIG. 5) is not exceeded.

The selected quantizer is used to quantize the weighted conversion coefficients for an entire sync block, even though the weighting coefficient may vary from block to block; and the quantized, weighted conversion coefficients thus produced are encoded in variable length code by encoder 67. The variable length coded conversion coefficients VLC are supplied to, for example, multiplexer 58 (FIG. 1) by way of output terminal 69. Similarly, the selector control signal produced by data volume predictor 75 also is supplied to the multiplexer by way of output terminal 76. This selector control signal is used in the same way as the output indication m produced by control circuit 55 of FIG. 1. That is, the selector control signal is used during a playback operation to select the proper dequantizer which is complementary to the quantizing circuit that had been selected by selector 66a during recording.

Thus, it is seen that the embodiment shown in FIG. 8 achieves the same desirable objectives as the embodiment of FIG. 1, wherein the same quantizing step is used to quantize conversion coefficients for an entire sync block while, nevertheless, providing fine quantization for those image blocks having a relatively low level of visual activity and coarse quantization for those image blocks having a relatively high level of visual activity. By weighting the conversion coefficients with a weighting factor that is inversely related to the detected visual activity of an image block, fine quantization can be obtained for an image block having low visual activity by weighting the conversion coefficients with a higher weighting factor than is used for an image block having high visual activity. It will, of course, be recognized that when a larger quantizing step is used to quantize a conversion coefficient having a larger weighting factor, the result is equivalent to fine quantization. Conversely, when that same quantizing step is used to quantize a conversion coefficient having a smaller weighting factor, the result is equivalent to coarse quantization.

Figure 7:
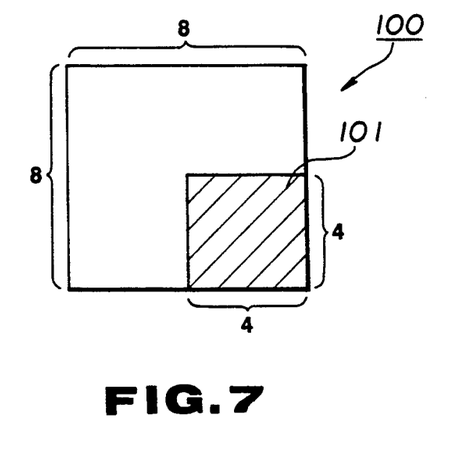
FIG. 7 is a schematic representation of how visual activity in an image block is calculated from a block of conversion coefficients.

In the embodiments shown in FIGS. 1 and 8, activity calculator 51 and activity detector 71 operate to calculate or detect visual activity $A_h$ of an image block $G_h$ as a function of the higher frequency AC components of the conversion coefficients $C_{ij}$. In One embodiment, the activity level is determined from the sum of the absolute values of such conversion coefficients. For example, the sum of the absolute values of the conversion coefficients $C_{ij}$, where i=6 or 7 and j=0–7, represent the high frequency components in the perpendicular direction of an image. This provides a reasonably accurate indication of visual activity. In another embodiment, such as shown in FIG. 7, the absolute values of conversion coefficients $C_{ij}$, wherein i=4–7 and j=4–7, may be summed.

While the present invention has been particularly shown and described with reference to preferred embodiments, it will be readily appreciated by those of ordinary skill in the art that various changes and modifications may be made without departing from the spirit and scope of the invention. For example, weighted conversion coefficients can be obtained without the use of separate weighting circuits, or multipliers, 53 and 65 (shown in FIGS. 1 and 8). As shown in FIG. 1, multiplier 53 may be bypassed, as represented by the one-dot-chain line, such that the conversion coefficients $C_{ij}$ produced by orthogonal transform circuit 13 are coupled directly to quantizing circuits $Q_1 \ldots Q_M$ In this alternative, the weighting coefficient K produced by weighting coefficient generator 52 is coupled to control circuit 55, as represented by the one-dot-chain line, and is used by the control circuit to produce the output indication m by which selector 54 selects the quantizer-coder-buffer channel determined by the weighting coefficient. Thus, depending upon the detected visual activity $A_h$ of an image block, that image block is quantized with a particular quantizing step which has the same effect as quantizing a weighted conversion coefficient. That is, in the alternative embodiment shown by the one-dot-chain lines in FIG. 1, the conversion coefficients $C_{ij}$ of an image block are quantized with different quantizing steps concurrently by common-connected quantizing circuits $Q_1 \ldots Q_M$, and one of these quantizing steps is selected by selector 54 under the control of control circuit 55 as a function of the weighting coefficient K supplied to the control circuit by weighting coefficient generator 52. Thus, even in this modified embodiment, weighted, quantized conversion coefficients having a weighting factor that is a function of the detected visual activity of the image block are produced, variable length coded and supplied by selector 54 to multiplexer 58.

In the embodiments described herein, orthogonal transform circuits 13 and 63 may be implemented by a digital signal processor (DSP) or by a suitably programmed microprocessor. Orthogonal transforms and the implementations thereof are known to those of ordinary skill in the art. Preferably, the orthogonal transform is a discrete cosine transform; but, as noted above, other known types of orthogonal transformation may be used, if desired.

It is intended that the appended claims be interpreted as covering the particular embodiments specifically described herein, those alternatives which have been mentioned above, and all equivalents thereto.

What is claimed is:

1. Image encoding apparatus for encoding image data samples comprising:
   block-forming means for forming plural blocks of image data samples, each block comprising a spatial array of n×n image data samples;
   orthogonal transform means for deriving the orthogonal transform of the image data samples of each block to produce conversion coefficients having a DC and plural AC components for each block;
   activity detection means responsive to only higher frequency AC components of the conversion coefficients of a block to detect visual activity of said block;
   weighting means for weighting the conversion coefficients of said block as a function of the detected visual activity of said block; and
   quantizing means for quantizing the weighted conversion coefficients.

2. The apparatus of claim 1 wherein said activity detection means is operable to produce an indication of visual activity of a block as a function of absolute values of said only higher frequency AC components of the conversion coefficients.

3. The apparatus of claim 1 wherein said orthogonal transform means comprises discrete cosine transform means for deriving a discrete cosine transform of said image data samples for each block.

4. The apparatus of claim 1 wherein the conversion coefficients are arranged in rows and wherein said higher frequency AC components include only conversion coefficients in approximately 25% of the rows representing the highest frequencies.

5. The apparatus of claim 1 wherein the conversion coefficients are arranged in rows and columns and wherein said higher frequency AC components include only conversion coefficients in approximately 50% of the rows and 50% of the columns representing the highest frequencies.

6. The apparatus of claim 1 wherein said quantizing means·comprise plural quantizers, each having a different respective quantization step.

7. The apparatus of claim 6 further comprising variable length encoding means for encoding quantized, weighted conversion coefficients from each of said quantizers and adapted to produce different variable length output codes, and selector means for selecting the variable length output code produced by said encoding means having minimum quantization width and maximum data volume.

8. The apparatus of claim 7 wherein said encoding means comprises plural variable length encoders, each coupled to a respective quantizer to produce a respective variable length output code, and wherein said selector means is further operable to select the variable length output code whose maximum data volume does not exceed a predetermined length.

9. The apparatus of claim 7 wherein said selector means is coupled to said quantizers for coupling the quantized, weighted conversion coefficients produced by one of said quantizers to said encoding means, and further including selector control means for controlling said selector means to select said one quantizer as a function of predicted data volume of the variable length output code.

10. The apparatus of claim 7 further comprising control means for controlling said selector means as a function of detected visual activity.

11. An image encoding apparatus for encoding image data samples comprising:

block-forming means for forming plural blocks of image data samples, each block comprising a spatial array of n×n image data samples;

orthogonal transform means for deriving the orthogonal transform of the image data samples of each block to produce conversion coefficients having a DC and plural AC components for each block;

activity detection means responsive to AC components of the conversion coefficients of a block to detect visual activity of said block;

weighting means for weighting the conversion coefficients of said block as a function of the detected activity;

plural quantizers, each having a different respective quantization step, for quantizing the weighted conversion coefficients; and     selector means for selecting one of said quantizers to quantize the weighted conversion coefficients of a predetermined number of blocks, whereby the same quantization step is used for each of said predetermined number of blocks withstanding changes in the visual activity in said blocks.

12. A method of encoding image data into sync blocks of fixed length and maximum data volume, comprising the steps of:

dividing a vertical interval of image data samples into a plurality of image blocks;

deriving the orthogonal transform of the image data samples in each image block to produce conversion coefficients having a DC component and plural AC components for each image block;

detecting the visual activity of only higher frequency AC components of the conversion coefficients of each image block;

quantizing the conversion coefficients of an image block with a common quantizing step to produce quantized data constituted by weighted, quantized conversion coefficients having a weighting factor that is a function of the detected visual activity of said image block;

encoding the quantized data of an image block by variable length coding to produce encoded data; and     combining the encoded data of a predetermined number of image blocks into a sync block of encoded data.

13. The method of claim 12 wherein the step of detecting the visual activity of each image block comprises summing the absolute values of only higher frequency AC components of the conversion coefficients of that block.

14. The method of claim 12 wherein the step of deriving the orthogonal transform comprises deriving the discrete cosine transform of the image data samples in each image block.

15. The method of claim 12 wherein the conversion coefficients are arranged in rows and wherein said higher frequency AC components include only conversion coefficients in approximately 25% of the rows representing the highest frequencies.

16. The method of claim 12 wherein the conversion coefficients are arranged in rows and columns and wherein said higher frequency AC components include only conversion coefficients in approximately 50% of the rows and 50% of the columns representing the highest frequencies.

17. A method of encoding image data into sync blocks of fixed length and maximum data volume, comprising the steps of:

dividing a vertical interval of image data samples into a plurality of image blocks;

deriving the orthogonal transform of the image data samples in each image block to produce conversion coefficients having a DC component and plural AC components for each image block;

detecting the visual activity of each image block;

generating a weighting coefficient for an image block as a function of the detected visual activity of that image block;

multiplying the conversion coefficients of an image block with said weighting coefficient to produce weighted conversion coefficients;

quantizing the weighted conversion coefficients of an image block with a selected one of plural different quantizing steps to produce quantized data;

encoding the quantized data of an image block by variable length coding to produce encoded data; and     combining the encoded data of a predetermined number of image blocks into a sync block of encoded data.

18. The method of claim 17 wherein the step of quantizing with a selected one quantizing step comprises quantizing the weighted conversion coefficients with different quantizing steps concurrently to produce differently quantized data, variable length coding each of the differently quantized data, storing a plurality of sync blocks, each containing variable length coded data produced by a different quantizing step, and selecting the quantizing step which produces the sync block exhibiting the highest data volume which does not exceed a given storage capacity.

19. The method of claim 18 wherein the step of selecting the quantizing step comprises sensing storage overflows of respective ones of the stored sync blocks, and selecting the next larger quantizing step used to produce a sync block that does not result in storage overflow.

20. The method of claim 17 wherein the step of quantizing with a selected one quantizing step comprises quantizing the weighted conversion coefficients with different quantizing steps concurrently to produce differently quantized data, predicting the data volume of each sync block formed of differently quantized data, and selecting the quantizing step which produces the sync block having the largest predicted data volume within a preset limit.

21. The method of claim 20 wherein the step of predicting the data volume of each sync block comprises: (a) selecting a prequantizing step of minimum value for prequantizing the conversion coefficients of an image block, (b) weighting the prequantized conversion coefficients of each image block to produce weighted prequantized data, (c) calculating an estimated data volume from the weighted prequantized data of an image block, (d) determining if the estimated data volume exceeds said preset limit, (e) increasing the value of said prequantizing step if the estimated data volume exceeds said preset limit, (f) repeating steps (a)-(d), and (g) sensing when the estimated data volume does not exceed said preset limit.

22. The method of claim 21 wherein the step of selecting the quantizing step comprises: (h) selecting a quantizing step corresponding to the value of the smallest prequantizing step which results in an estimated data volume that does not exceed said preset limit.

23. A method of encoding image data into sync blocks of fixed length and maximum data volume, comprising the steps of:

dividing a vertical interval of image data samples into a plurality of image blocks;

deriving the orthogonal transform of the image data samples in each image block to produce conversion coefficients having a DC component and plural AC components for each image block;

detecting the visual activity of each image block;

generating a weighting coefficient for an image block as a function of the detected visual activity of that image block;

quantizing the conversion coefficients of an image block with different quantizing steps concurrently;

selecting one of said quantizing steps as a function of said weighting coefficient to produce quantized data;

encoding the quantized data of an image block by variable length coding to produce encoded data; and combining the encoded data of a predetermined number of image blocks into a sync block of encoded data.

* * * * *